United States Patent
Woltz

(10) Patent No.: US 9,394,028 B2
(45) Date of Patent: Jul. 19, 2016

(54) RUBBER MOUNTED DRIVETRAIN STABILIZER FOR MOTORCYCLES

(71) Applicant: Bruce R. Woltz, Poway, CA (US)

(72) Inventor: Bruce R. Woltz, Poway, CA (US)

(*) Notice: Subject to any disclaimer, the term of this patent is extended or adjusted under 35 U.S.C. 154(b) by 0 days.

(21) Appl. No.: 15/042,076

(22) Filed: Feb. 11, 2016

(65) Prior Publication Data

US 2016/0159428 A1    Jun. 9, 2016

Related U.S. Application Data

(63) Continuation-in-part of application No. 14/273,972, filed on May 9, 2014.

(51) Int. Cl.
*B62K 11/04* (2006.01)
*B62K 25/28* (2006.01)
*B62M 7/02* (2006.01)

(52) U.S. Cl.
CPC ............... *B62K 25/283* (2013.01); *B62K 11/04* (2013.01); *B62K 25/286* (2013.01); *B62M 7/02* (2013.01)

(58) Field of Classification Search
CPC ...... B62K 11/00; B62K 11/04; B62K 25/283; B62K 25/286; B62M 7/02
USPC ................................................. 180/219, 227
See application file for complete search history.

(56) References Cited

U.S. PATENT DOCUMENTS

| | | | | |
|---|---|---|---|---|
| 3,997,032 A * | 12/1976 | Kondo | ................... | F16D 55/227 188/72.4 |
| 4,373,602 A * | 2/1983 | Tomita | ..................... | B62M 7/04 180/227 |
| 4,392,542 A * | 7/1983 | Aiba | ..................... | B62K 11/04 180/228 |
| 4,453,616 A * | 6/1984 | Porter | ...................... | B60G 7/02 180/210 |
| 6,131,684 A * | 10/2000 | Ticknovich | .......... | B62K 25/283 180/227 |
| 6,378,644 B1 * | 4/2002 | Brown | ................. | B62K 25/283 180/227 |
| 6,547,207 B1 * | 4/2003 | Thompson | ................ | F16F 1/38 248/609 |
| 7,201,246 B2 * | 4/2007 | Brendelson | .............. | B62M 7/02 180/219 |
| 7,677,348 B1 * | 3/2010 | Phillips | ................... | B62K 11/04 180/228 |
| 2003/0106733 A1 * | 6/2003 | Keller | ..................... | B62K 11/04 180/228 |
| 2005/0161271 A1 * | 7/2005 | Kimori | .................. | B62K 21/04 180/219 |
| 2008/0067772 A1 * | 3/2008 | Weagle | ................. | B62K 25/286 280/124.134 |
| 2009/0208155 A1 * | 8/2009 | Blane | ................... | B62K 25/283 384/299 |
| 2009/0218776 A1 * | 9/2009 | Whitacre | ................. | B60G 7/02 280/86.756 |
| 2010/0089683 A1 * | 4/2010 | Ore | ....................... | B62K 25/283 180/227 |

\* cited by examiner

*Primary Examiner* — Joseph Rocca
*Assistant Examiner* — Marc A Scharich
(74) *Attorney, Agent, or Firm* — IDP Patent Services; Olav M. Underdal

(57) ABSTRACT

A stabilized rubber mounted drivetrain includes a standard rubber mounted drivetrain, further comprising a swingarm pivotal axle, rubber isolators, support brackets; and swingarm stabilizers, which each further include a stabilizer cap, a thrust bearing, and a spacer, such that a swingarm stabilizer is mounted to both ends of the swingarm pivot axle. The stabilized rubber mounted drivetrain provides increased stability of the rubber isolators and the swing arm pivotal axle, to ensure the drivetrain is held in place during driving events with lateral forces. The stabilizer cap can include a stabilizer cap head, a stabilizer cap flange, and a stabilizer cap body, and can be machined from one piece of a metal alloy or assembled from separate parts.

16 Claims, 13 Drawing Sheets

Swing arm stabilizer system

RUBBER MOUNTED DRIVETRAIN STABILIZER FOR MOTORCYCLES

CROSS-REFERENCE TO RELATED APPLICATIONS

This application is a continuation-in-part of U.S. Non-Provisional application Ser. No. 14/273,972, filed May 9, 2014.

FIELD OF THE INVENTION

The present invention relates generally to the field of rubber mounted drivetrains for motorcycles, and particularly to devices for stabilizing such rubber mounted drivetrains where the frame supports the drivetrain by holding it between two opposing rubber or elastic mounts.

BACKGROUND OF THE INVENTION

Some motorcycles due to design of the motor cannot completely balance the reciprocating mass inside the motor. To reduce the vibrations, the drivetrain is isolated with flexible couplings made from rubber or other flexible devices. In this context, the drivetrain consists of the motor, transmission, swingarm and a rear drive wheel.

With the drivetrain being suspended by rubber isolators, it can move in directions that cause instability issues, which affect Harley Davidson touring machines and other motorcycle makes and models. This driving instability issue is commonly called "bagger wobble" and is characterized such that when a heavy touring motorcycle is placed in a turn, the entire motorcycle can become unstable, entering a momentary wobbling state. The rubber mount allows the rear wheel to twist or move laterally, thereby upsetting the wheel alignment. This condition can also occur when the motorcycle is operated at high speed in a straight line. The isolation systems fail to hold the rear wheel in proper alignment and an oscillation ensues.

Conceived as a new mechanism for drivetrain isolation, the concept of a rubber mounted drivetrain system was originally developed by Norton Motorcycles in the late 1960's and early 1970's.

Harley-Davidson developed their version of the rubber mounted drivetrain system in the late 1970's. The system utilizes a front rubber isolator and in some versions a link to control lateral movement in the front, a link at the top of the motor to keep the drivetrain upright, and rubber isolation devices at the rear near the transmission and swingarm. The rubber isolators in the back attempt to hold the drivetrain in alignment. Its implementation has remained unchanged until today with the exception of various aftermarket accessories.

Examination of the current aftermarket offerings show that they fall into two categories:
 a. They attempt to limit the compression of the rubber isolator by adding a stiff plastic piece or a different isolator all together; or
 b. They fasten to a cross member or part of the frame, and utilize a link to control the motorcycle drivetrain side-to-side play.

Examples of current aftermarket offerings include:
 a. Bagger-Brace manufactured by Phoenix Customs;
 b. STA-BO swingarm bushing stabilizers. This aftermarket offering is related to US Patent Application 20090208155, titled "Swingarm bushing stabilizer for Harley-Davidson";
 c. Touring Link chassis stabilizer, manufactured by Progressive Suspension;
 d. Glide-Pro Stabilizing System;
 e. True-Track swingarm pivot anchors. This aftermarket offering is related to U.S. Pat. No. 7,677,348, titled "Apparatus for deterring instability of a motorcycle".

Current aftermarket offerings have certain limitations, particularly that they either are simple in design, but do not provide significant added stability, or that they are complex structural components, which are expensive and difficult to install.

As such, considering the foregoing, it may be appreciated that there continues to be a need for novel and improved devices and methods for improving lateral stability of a motorcycle drivetrain system.

SUMMARY OF THE INVENTION

The foregoing needs are met, to a great extent, by the present invention, wherein in aspects of this invention, enhancements are provided to the existing model of rubber mounted drivetrains, in order to provide much improved stability without having to make complex and costly modifications.

In an aspect, a stabilized rubber mounted drivetrain, as further presented herein, adopts a different approach to motorcycle stability in that it utilizes the opposite side of the frame to keep the driveline from moving laterally. This better distribution of load minimizes flex between the motorcycle chassis and the drivetrain.

In an aspect, the stabilized rubber mounted drivetrain stiffens the rear driveline connection to the frame for Harley Davidson Touring bikes and other manufacturer's motorcycles that utilize compressed rubber suspension devices between the motorcycle chassis and the rear swingarm mount. When the motorcycle is in a turn, the lateral forces push against only one side of the frame. This force can cause the one side of the frame to flex. The stabilized rubber mounted drivetrain ties both sides of the frame together through the swingarm pivot axle, so that both sides of the frame support the load. The system also increases straight-line stability, minimizing risk of small side forces starting an oscillation.

In a related aspect, the stabilized rubber mounted drivetrain, in addition to a standard rubber mounted drivetrain, includes two additional specialized fasteners, called swingarm stabilizers, which attach to the ends of the swingarm pivot axle, and can further contain some thrust bearings and shims to adjust the clearance between the fasteners and the thrust bearings.

In yet a related aspect, the stabilized rubber mounted drivetrain ties both sides of the motorcycle frame together through the swingarm pivot axle. Two swingarm stabilizers including thrust bearings tie the two sides. When the motorcycle is traveling straight, the swingarm stabilizers have no load on them. As the motorcycle enters a turn, a sideways force may cause the drivetrain to move slightly. The swingarm stabilizers distribute part of the load to the other side of the motorcycle frame, thereby reducing chassis to drivetrain flex and helping to stabilize the motorcycle.

In an aspect, a stabilized rubber mounted drivetrain for mounting on a motorcycle, can include:
 a) a rubber mounted drivetrain, including:
  a swingarm pivotal axle, which is configured as a pivotal axle for a swingarm of the motorcycle;
  a rubber isolator; and a support bracket, which is connected to a motorcycle frame
wherein the at least one rubber isolator is mounted adjacent to and between an end of the swingarm pivotal axle and the support bracket, whereby the rubber isolator prevents outward movement of the end of the swingarm pivotal axle relative to the motorcycle frame, while providing a rubberized isolation and reducing transfer of vibrations from the rubber mounted drivetrain to the motorcycle frame; and b) a swingarm stabilizer, including:
a stabilizer cap; and
a thrust bearing;
wherein an inner end of the stabilizer cap is connected to the end of the swingarm pivotal axle, such that the thrust bearing is held in place relative to the motorcycle frame by contact with an outer end of the stabilizer cap;
wherein an inner surface of the thrust bearing is configured to be immediately adjacent to or in contact with an outer surface of the at least one support bracket, whereby the swingarm stabilizer reduces inward movement of the end of the swingarm pivotal axle relative to the motorcycle frame;
whereby the swingarm pivotal axle is held in place and stabilized relative to the motorcycle frame during motorcycle driving events in which the rubber mounted drivetrain endures strong lateral forces.

There has thus been outlined, rather broadly, certain embodiments of the invention in order that the detailed description thereof herein may be better understood, and in order that the present contribution to the art may be better appreciated. There are additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
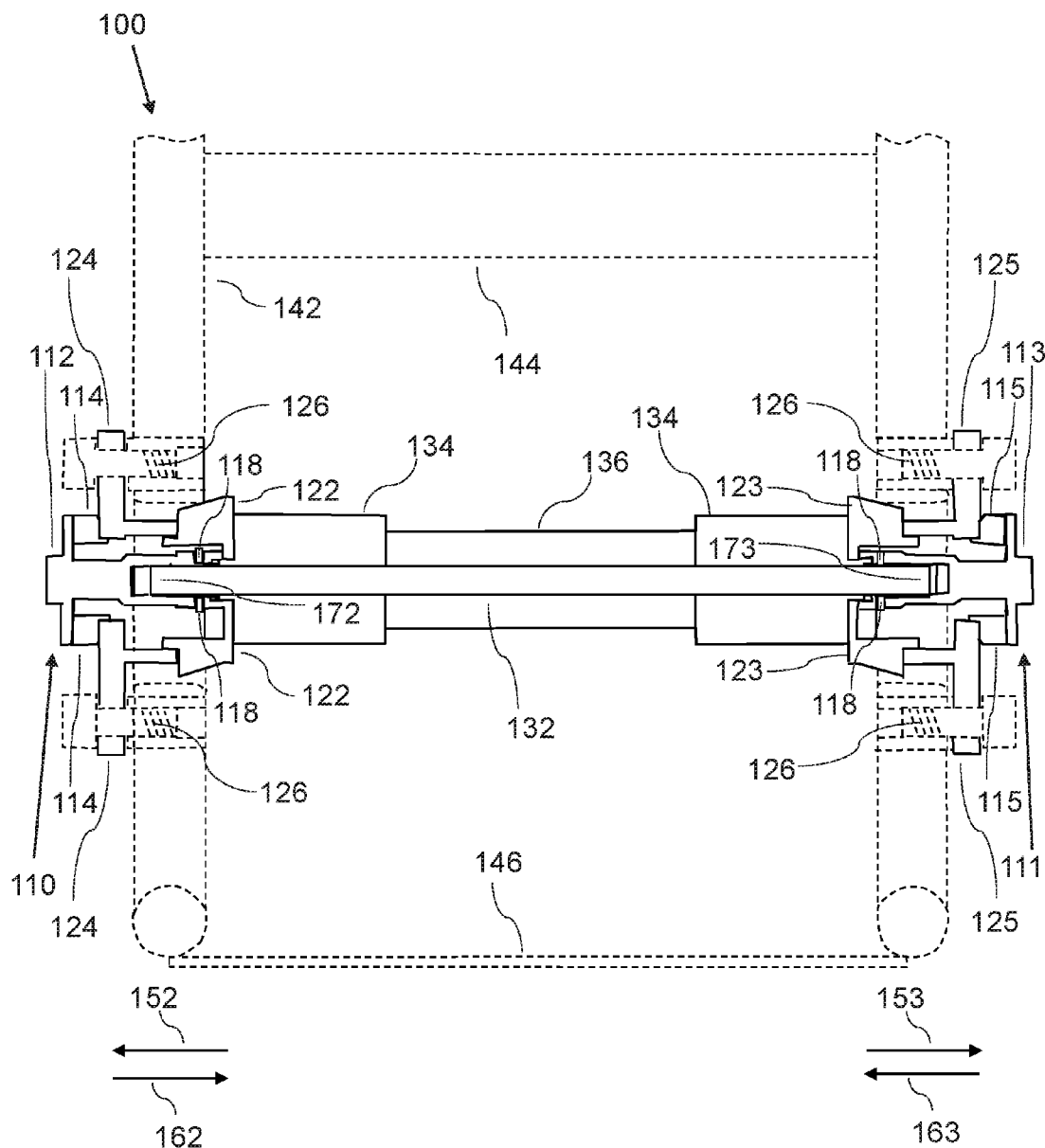
FIG. 1 is a rear cross-sectional view, illustrating a stabilized rubber mounted drivetrain, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, a drivetrain of a motorcycle shall be defined to include the motor, transmission, swingarm, and a rear drive wheel.

In the following, we describe the structure of an embodiment of a stabilized rubber mounted drivetrain 100 with reference to FIG. 1, in such manner that like reference numerals refer to like components throughout; a convention that we shall employ for the remainder of this specification.

In an embodiment, FIG. 1 illustrates a rear cross-sectional view of a stabilized rubber mounted drivetrain 100 for mounting on a motorcycle, including:

a. A standard rubber mounted drivetrain, including:
i. A swingarm pivotal axle 132; which serves as a pivotal axle for swingarm of the motorcycle;
ii. Rubber isolators 122 123; comprising a left rubber isolator 122 and a right rubber isolator 123;
iii. Support brackets 124 125, comprising a left support bracket 124 and a right support bracket 125, wherein the support brackets are connected to the motorcycle frame 142 with screws 126;

wherein the rubber isolators are mounted tightly between the swingarm pivotal axle 132 and the support brackets 124 125, and the swingarm 134 and the transmission 136 are mounted around the swingarm pivotal axle 132;

whereby the right rubber isolator 123 reduces outward movement 153 of the right end 173 of the swingarm pivotal axle 132 relative to the motorcycle frame 142, which is equivalent to reducing right lateral movement 153 162 of the of the swingarm pivotal axle 132;

whereby the left rubber isolator 122 reduces outward movement 152 of the left end 172 of the swingarm pivotal axle 132 relative to the motorcycle frame 142, which is equivalent to reducing left lateral movement 152 163 of the of the swingarm pivotal axle 132;

such that the rubber isolators 122 123 secure and hold the swingarm pivotal axle 132 in place, while providing a rubberized isolation reducing transfer of vibrations from the swingarm, transmission, and swingarm pivotal axle 132 to a motorcycle frame 142;

b. swingarm stabilizers 110 111, comprising:
  i. a left swingarm stabilizer 110, further comprising:
    1. a left stabilizer cap 112; and
    2. a left thrust bearing 114;
    wherein an inner end of the left stabilizer cap 112 can be connected to the left end point of the swingarm pivotal axle 132; such that the left thrust bearing 114 is held in place by a contact with an outer end of the left stabilizer cap 112, such that an inner surface of the left thrust bearing 114 is directly adjacent to or in contact with an outer surface of the left support bracket 124;
    whereby the left swingarm stabilizer 110 reduces inward movement 162 of the left end 172 of the swingarm pivotal axle relative to the motorcycle frame 142, which is equivalent to reducing right lateral movement 153 162 of the swingarm pivotal axle 132, thereby providing an increased stability of the left rubber isolator 122, reducing the risk that the left rubber isolator 122 becomes unloaded;
    whereby the left rubber isolator 122 can be held in place during driving events with strong lateral forces, such as during high-speed turns; and
  ii. a right swingarm stabilizer 111, further comprising:
    1. a right stabilizer cap 113; and
    2. a right thrust bearing 115;
    wherein an inner end of the right stabilizer cap 113 can be connected to the right end point of the swingarm pivotal axle 132, such that the right thrust bearing 115 is held in place by a contact with an outer end of the right stabilizer cap 113, such that an inner surface of the right thrust bearing 115 is adjacent to an outer surface of the right support bracket 125;
    whereby the right swingarm stabilizer 111 reduces inward movement 163 of the right end 173 of the swingarm pivotal axle relative to the motorcycle frame 142, which is equivalent to reducing left lateral movement 152 163 of the of the swingarm pivotal axle 132, thereby providing an increased stability of the right rubber isolator 123, reducing the risk that the right rubber isolator 123 becomes unloaded;
    whereby the right rubber isolator 123 can be held in place during driving events with strong lateral forces, such as during heavy turns;
    whereby the swingarm pivotal axle 132 is held in place and stabilized relative to the motorcycle frame 142 during motorcycle driving events in which the rubber mounted drivetrain endures strong lateral forces.

In typical standard motorcycles, the motorcycle frame 142, can further comprise:
  a. An upper cross brace 144; and
  b. A lower cross brace 146;
  wherein the upper cross brace 144 and the lower cross brace 146 serve to stabilize the motorcycle frame 142.

During turning maneuvers, the motorcycle section can flex due to lateral forces. In a standard configuration with a standard rubber mounted drivetrain, without swingarm stabilizers 110 111 mounted, only one side of the motorcycle frame 142 supports the load. In this standard configuration, the isolator is typically mounted with a slip fit feature, which can cause the rubber isolators 122 123 to become unloaded during strong lateral load while turning, which can further cause the rubber isolators 122 123 to slip, whereby the swingarm pivotal axle 132 becomes unstable. This sequence of events can directly cause directional instability during high-speed turns, which can be so severe that it can cause a driver to lose control of the motorcycle.

In typical variants of the standard configuration of a rubber mounted swingarm axle, a specially designed nut applies pressure to the rubber isolators 122 123 and thereby holds the rubber isolators 122 123 in place. In all such standard configurations, however, the nut does not provide any connection to or any stabilization of the support brackets 124 125.

In typical variants of a standard rubber mounted drivetrain, the support bracket 124 125 may be designed as a separate part, which is connected to the motorcycle frame 142. However, in alternative variants, the support bracket 124 125 may be an integral part of the motorcycle frame 142. Furthermore, in yet other alternative variants, the design of the motorcycle frame 142 may be configured such that it includes the function of the support bracket 124 125, without the support bracket 124 125 being identifiable as a component of the motorcycle frame 142.

Both the upper cross brace 144 and the lower cross brace 146 can typically be mounted 6-8 inches from the swingarm pivotal axle 132, respectively above and below the swingarm pivotal axle 132.

Figure 2:
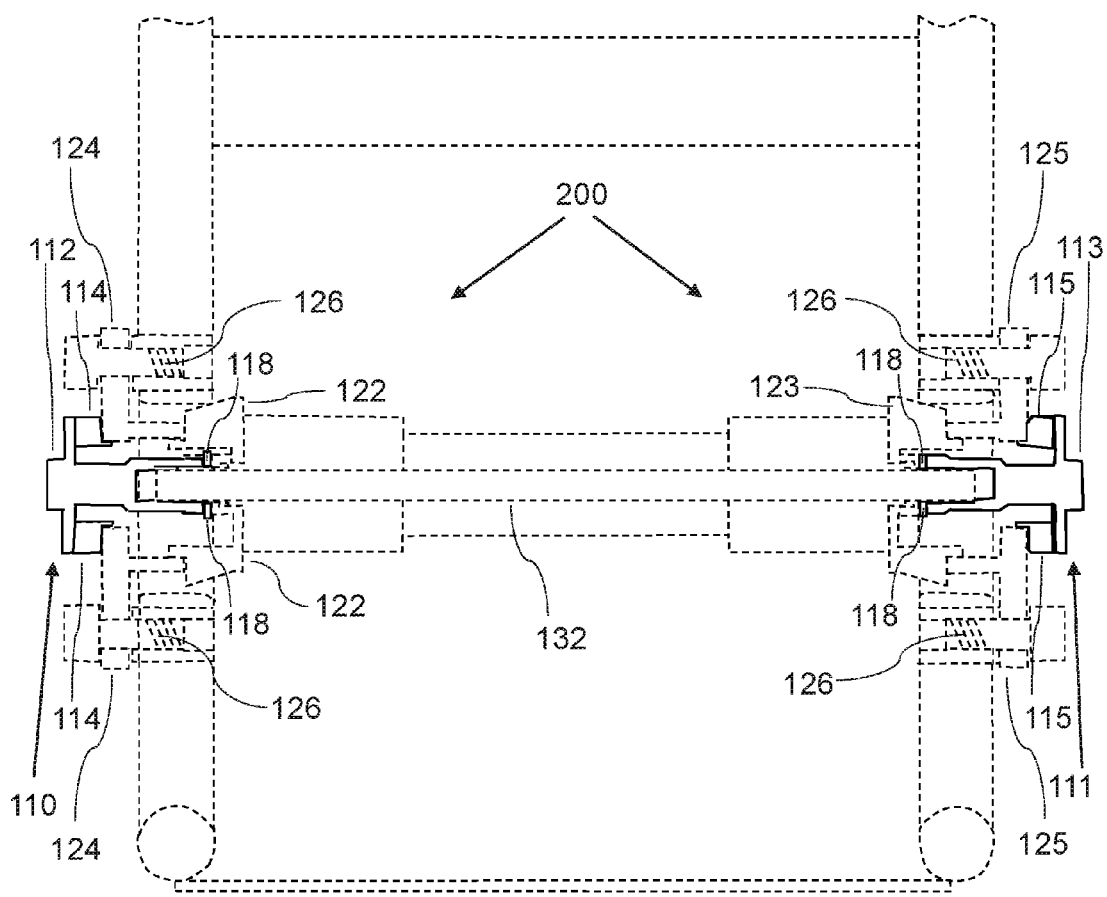
FIG. 2 is a rear cross-sectional view, illustrating a swingarm stabilizer, according to an embodiment of the invention.

In an embodiment, as illustrated in FIG. 2, a swingarm stabilizer system 200, can comprise:
  a. a left swingarm stabilizer 110, further comprising:
    i. a left stabilizer cap 112; and
    ii. a left thrust bearing 114;
    wherein the left stabilizer cap 112 can be connected to the left end point of the swingarm pivotal axle 132; such that the left thrust bearing 114 is held in place by a contact with an outer end of the left stabilizer cap 112, such that an inner surface of the left thrust bearing 114 is adjacent to or in direct contact with an outer surface of the left support bracket 124;
    whereby the left swingarm stabilizer 110 reduces inward movement 162 of the left end 172 of the swingarm pivotal axle relative to the motorcycle frame 142, which is equivalent to reducing right lateral movement 153 162 of the of the swingarm pivotal axle 132; thereby providing an increased stability of the left rubber isolator 122, reducing the risk that the left rubber isolator 122 becomes unloaded;

whereby the left rubber isolator 122 can be held in place during driving events with strong lateral forces, such as during high-speed turns; and b. a right swingarm stabilizer 111, further comprising:
  i. a right stabilizer cap 113; and
  ii. a right thrust bearing 115;
  wherein the right stabilizer cap 113 can be connected to the right end point of the swingarm pivotal axle 132; such that the right thrust bearing 115 is held in place by contact with an outer end of the right stabilizer cap 113, such that an inner surface of the right thrust bearing 115 is directly adjacent to or in contact with an outer side of the right support bracket 125;
  whereby the right swingarm stabilizer 111 reduces inward movement 163 of the right end 173 of the swingarm pivotal axle relative to the motorcycle frame 142, which is equivalent to reducing left lateral movement 152 163 of the of the swingarm pivotal axle 132, thereby providing an increased stability of the right rubber isolator 123, reducing the risk that the right rubber isolator 123 becomes unloaded;
  whereby the right rubber isolator 123 can be held in place during driving events with strong lateral forces, such as during heavy turns.

In a related embodiment, the swingarm stabilizers 110 111 can replace standard nuts on a standard rubber mounted drivetrain.

Figure 3:
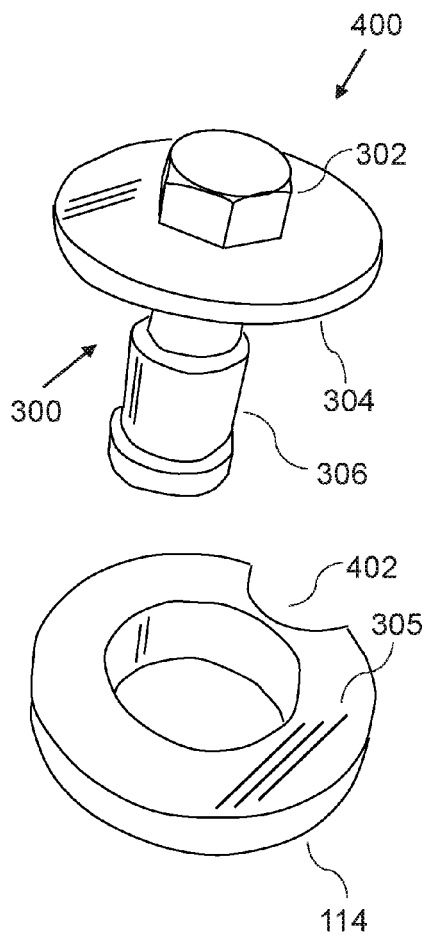
FIG. 3 is an outer-side perspective view of a swingarm stabilizer, according to an embodiment of the invention.
Figure 4:
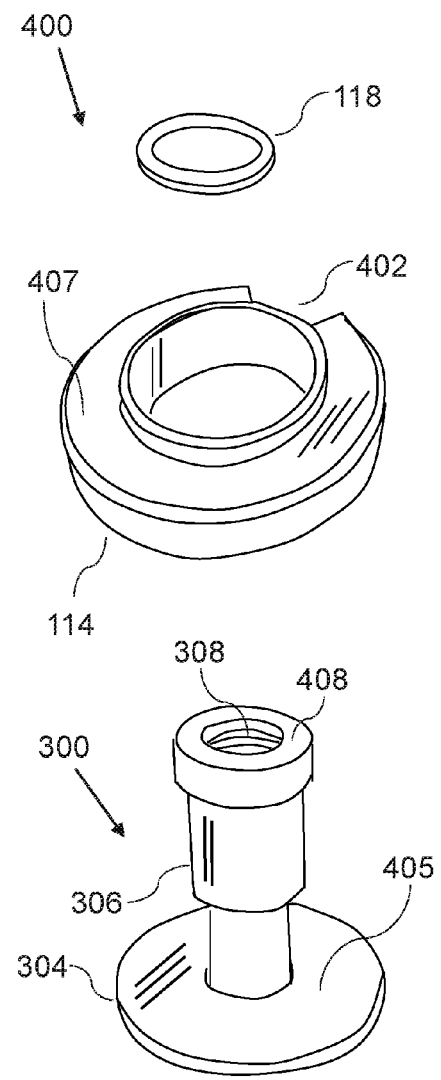
FIG. 4 is an inner-side perspective view of a swingarm stabilizer, according to an embodiment of the invention.

In a related embodiment, FIG. 3 and FIG. 4 show perspective views of a swingarm stabilizer 400, which could be installed either as a left swingarm stabilizer 110, or a right swingarm stabilizer 111.

In a related embodiment, FIG. 3 and FIG. 4 show perspective views of a stabilizer cap 300, which could function either as a left stabilizer cap 112, or a right stabilizer cap 113.

In a related embodiment, FIG. 3 shows an outer-side perspective view of a stabilizer cap 300, further comprising:

a. A stabilizer cap head 302, which can be configured as a bolt head to allow for easy use with a wrench tool;
b. A stabilizer cap flange 304; wherein the stabilizer cap flange 304 is designed to hold the thrust bearing 114 115 in place;
c. A stabilizer cap body 306; wherein the inner end of the stabilizer cap body 306 can be configured to connect to the either the right or left end of a swingarm pivotal axle 132;
wherein the stabilizer cap head 302, is connected to the outer end of the stabilizer cap body 306; and the stabilizer cap flange 304 is mounted on the inside of the stabilizer cap head 302, towards the outer end of the stabilizer cap body 306, such that the stabilizer cap flange 304 is configured to be directly adjacent to or in contact with the thrust bearing 114 115, such that the stabilizer flange in conjunction with the thrust bearing 114 115 reduce inward lateral movement 162 163 of the stabilizer cap 300, thereby reducing inward lateral movement of the swingarm pivotal axle 132, when the stabilizer cap flange 304 is attached to an end of the swingarm pivotal axle 132, with the thrust bearing 114 115 mounted between the stabilizer cap flange 304 and the thrust bearing 114 115.

In a related embodiment, FIG. 4 shows an inner-side perspective view of a stabilizer cap 300, wherein the inner end of the stabilizer cap body 306 further comprises a threaded cavity 308, such that the threaded cavity 308 can be screwed on a threaded or bolt end of the swingarm pivotal axle 132.

In various related embodiments, the stabilizer cap 300 can be machined from one piece of a metal alloy, such that the stabilizer cap head 302, the stabilizer cap flange 304, and the stabilizer cap body 306 are all integral parts of the machined piece. The metal alloy can for example be a high-strength steel alloy commonly used for similar automotive parts, such as load bearing fasteners.

Figure 14:
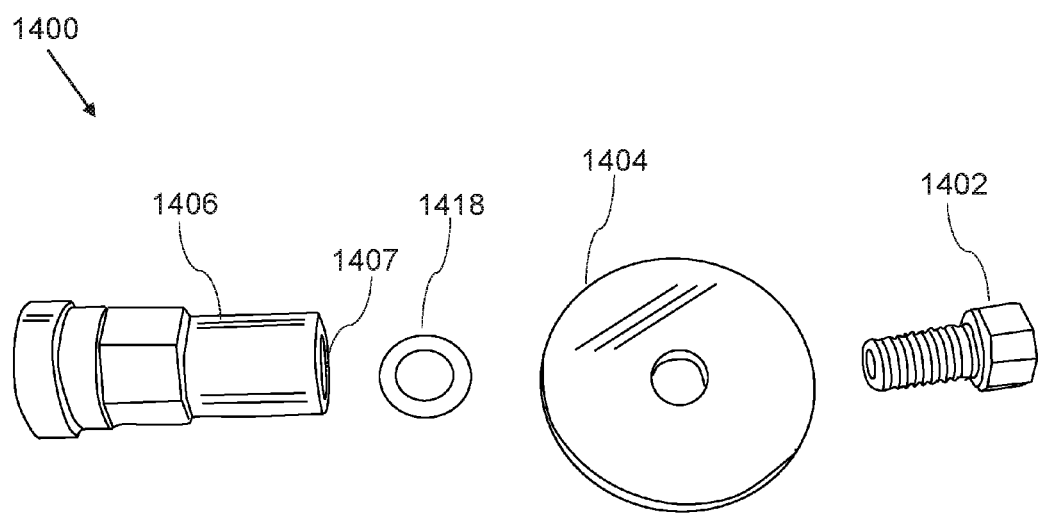
FIG. 14 is a perspective view of components of a stabilizer cap, according to an embodiment of the invention.

In various other related embodiments, the stabilizer cap 300, can be assembled from separate components comprising respectively the stabilizer cap head 302, the stabilizer cap flange 304, and the stabilizer cap body 306, which can each be made of metal alloys, which can be either the same or different metal alloys. For example, as shown in FIG. 14, a stabilizer cap 1400, can be assembled from separate components, comprising a stabilizer cap body 1406, further including an outer threaded cavity 1407, and a stabilizer cap head 1402 in the form of a bolt, which is configured to be screwed into the threaded cavity 1407 in the outer end of the stabilizer cap body 1406, and a circular spacer 1404, functioning as the stabilizer cap flange 1404, can then be secured between the stabilizer cap head 1402 and the stabilizer cap body 1406, such that the threaded end of the stabilizer cap head 1402 protrudes through a central aperture of the stabilizer cap flange 1404.

In a further related embodiment, the stabilizer cap 1400 can further include a spacer 1418, which is configured to be mounted between the stabilizer cap body 1406 and the stabilizer cap flange 1404, such that the threaded end of the stabilizer cap head 1402 protrudes through a central aperture of the spacer 1418, whereby the spacer 1418 adjusts the position of the swingarm stabilizer 400 outwards, and thereby adjusts the clearance between the stabilizer cap flange 1404 and the thrust bearing 114 115. The adjusted clearance can be:

a) positive, indicating there can be some gap between components;
b) zero or substantially zero, indicating all components can be mounted directly adjacent with contact, but without tightening load/pressure, or
c) negative, indicating all components can be mounted directly adjacent with contact, and with tightening load/pressure, which may induce some compression of thrust bearings 114 115 and rubber isolators 122 123.

In various related embodiments, the thrust bearings 114 115, can be made of a suitable plastic material, such that the inner surface of the thrust bearings 114 115 have a low coefficient of friction, and thereby can allow radial movement of the rubber isolators 122 123, while preventing or minimizing lateral/axial movement. Such a suitable plastic material can for example have a tensile strength in a range of 10,000-14,000 psi, a Rockwell hardness rating of R 108-R 120, and a low coefficient of friction in a range of 0.05-0.20. Examples of such suitable plastic materials include MDS-Filed Nylon 6/6 and Delrin Acetal Resin.

In a related embodiment, FIG. 3 and FIG. 4 show perspective views of a thrust bearing 114, which could be installed either as a left thrust bearing 114, or a right thrust bearing 115.

In a related embodiment, FIG. 3 shows an outer-side perspective view of a thrust bearing 114 115, such that the shape of the inner surface 407 of the thrust bearing 114, as shown in FIG. 4, is configured to match with a particular shape of an outer surface of an existing support bracket 124 125.

In a related embodiment, FIG. 4 shows an inner-side perspective view of the thrust bearing 114 115, such that the shape of the outer surface 305 of the thrust bearing 114 115, as shown in FIG. 3, is configured to match with the shape of the inner surface 405 of the stabilizer cap flange 304.

In a further related embodiment, the thrust bearing 114 115 can have an aperture 402, including a cutout, to allow for fitting with cables, wires, or other attachments that connect to the support bracket 124 125, or the adjacent areas.

In a further related embodiment, the swingarm stabilizer 400 can further comprise a spacer 118, also referred to as a shim 118, as shown in FIGS. 1, and 4, such that the spacer 118, as shown in FIG. 1, can be mounted on an end of the swingarm pivotal axle 132, inside the inner end of the stabilizer cap 112 113, between an inner end of the stabilizer cap 112 113 and the rubber isolator 122 123, whereby the spacer 118 adjusts the position of the stabilizer cap flange 1404 outwards, and thereby adjusts the clearance between the stabilizer cap flange 1404 and the thrust bearing 114 115. More specifically, the spacer 118 can be mounted between an inner end 408 (as shown in FIG. 4) of the stabilizer cap body 306 and an outer side of the rubber isolator 122 123, such that the swingarm pivotal axle 132 protrudes through an aperture of the spacer 118. The adjusted clearance can be:

a) positive, indicating there can be some gap between components;

b) zero or substantially zero, indicating all components can be mounted directly adjacent with contact, but without tightening load/pressure, or c) negative, indicating all components can be mounted directly adjacent with contact, and with tightening load/pressure, which may induce some compression of the thrust bearing 114 115 and the rubber isolator 122 123.

In a related embodiment, the swingarm stabilizer 400 components shown in FIGS. 3 and 4 are configured with specific shapes to match a standard rubber mounted drivetrain of various model series of Harley Davidson touring motorcycles.

In various alternative related embodiments, the specific shape of the components of the swingarm stabilizer 400 can be configured with specific shapes to match other motorcycle original equipment manufacturers pre-existing standard rubber mounted drivetrains, or to match a new design for standard rubber mounted drivetrain, as part of a new design for a stabilized rubber mounted drivetrain 100.

Figure 5:
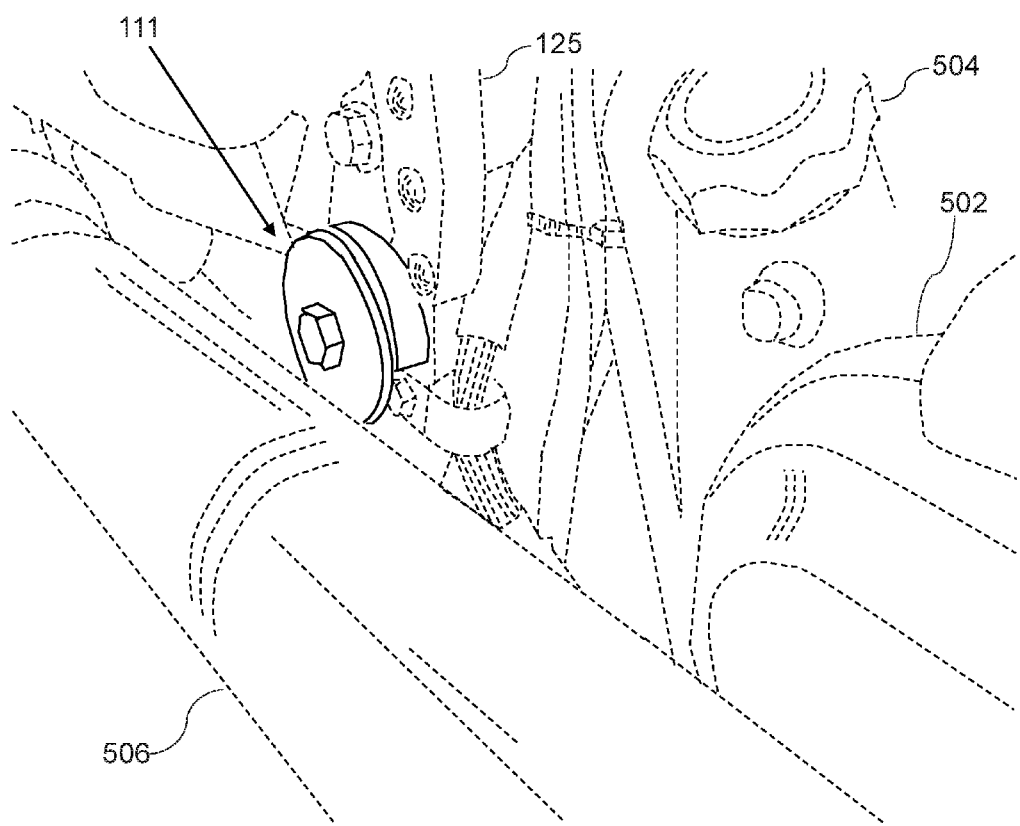
FIG. 5 is a right-side perspective view of a swingarm stabilizer mounted on a motorcycle, according to an embodiment of the invention.

In a related embodiment, FIG. 5 shows a right-side perspective view of a right swingarm stabilizer 111 mounted on the right side of a motorcycle, also showing part of a right support bracket 125, and further showing a rear outer part of a transmission 502, an oil cap 504, and an exhaust pipe 506.

Figure 6:
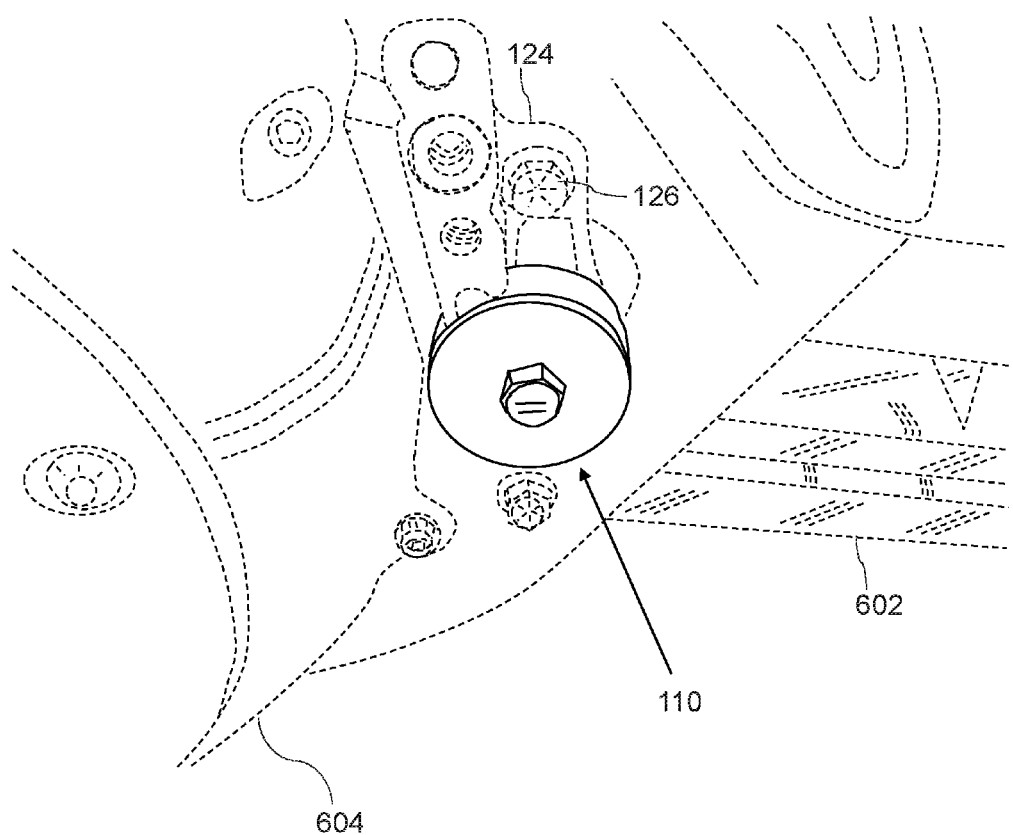
FIG. 6 is a left-side perspective view of a swingarm stabilizer mounted on a motorcycle, according to an embodiment of the invention.

In a related embodiment, FIG. 6 shows a left-side perspective view of a left swingarm stabilizer 110 mounted on the left side of a motorcycle, on an outer side of a left support bracket 124, which is tightened with a screw 126. FIG. 6 further shows, a rear of a primary drive cover 604, and a left side of a swingarm 602.

Figure 7:
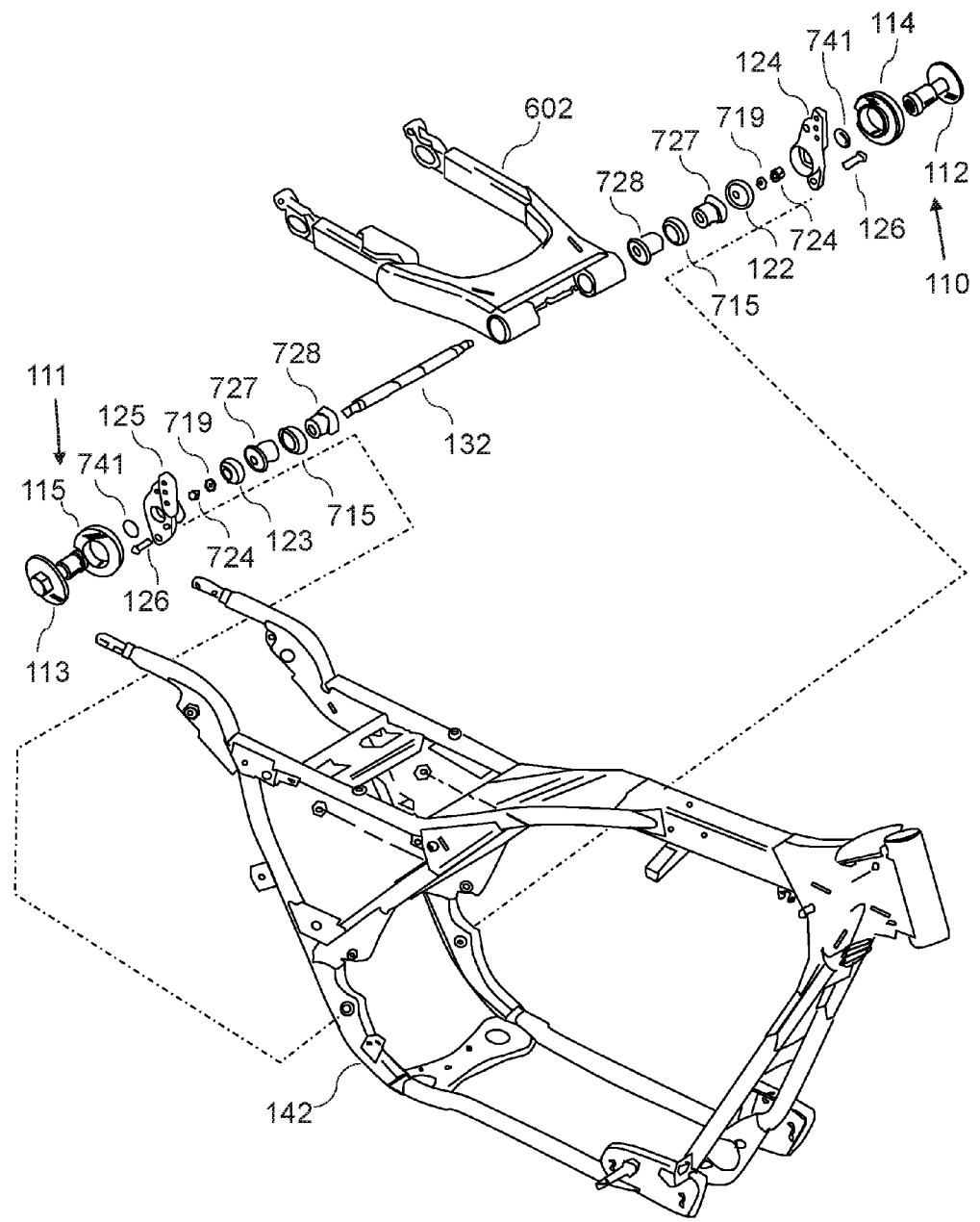
FIG. 7 is an exploded view of a standard rubber mounted drive train system, according to an embodiment of the invention.

In an example embodiment, FIG. 7 shows an exploded view of parts of a standard rubber mounted drive train system, showing all parts for a rubber mounted drive train for a 2007 model year Harley-Davidson FLHRC FR Road King Classic touring motorcycle, including:

a standard rubber mounted drive train, including:
   a) right and left screws 126, as also shown in FIG. 1;
   b) right and left caps 741;
   c) right support brackets 125, which can be Harley-Davidson Part. No. 50589-07;
   d) left support brackets 124, which can be Harley-Davidson Part. No. 50588-07;
   e) right and left nuts 724;
   f) right and left washers 719;
   g) right and left rubber isolators 123 122, which can be Harley-Davidson Part. No. 47564-86B, also referred to as rubber mounts 123 122;
   h) right and left spacers 727;
   i) right and left bearings 715;
   j) right and left spacers 728;
   k) a swingarm pivotal axle 132, also referred to as a shaft 132, which can be Harley-Davidson Part. No. 47505-02;
   l) a swingarm 602, which can be Harley-Davidson Part. No. 47549-02A, which can also be called a rear fork 602; all of which are attached to
   m) a frame 142, which can be Harley-Davidson Part. No. 47900-07BHP; wherein the standard rubber mounted drive train is mounted with:
right and left swingarm stabilizers 111 110, each respectively comprising a stabilizer cap 113 112 and a thrust bearing 115 114,
   such that the right and left caps 741 and the right and left nuts 724 are removed, in order to install the right and left swingarm stabilizers 111 110.

In related embodiments, engine stabilizers, including stabilizer cap and thrust bearing, may also be used on other rubber isolated mounting points, which are part of a standard rubber mounted drivetrain system. This can for example include front and rear engine mounts, such as for example used on various 2009 and newer Harley-Davidson touring models.

Figure 8:
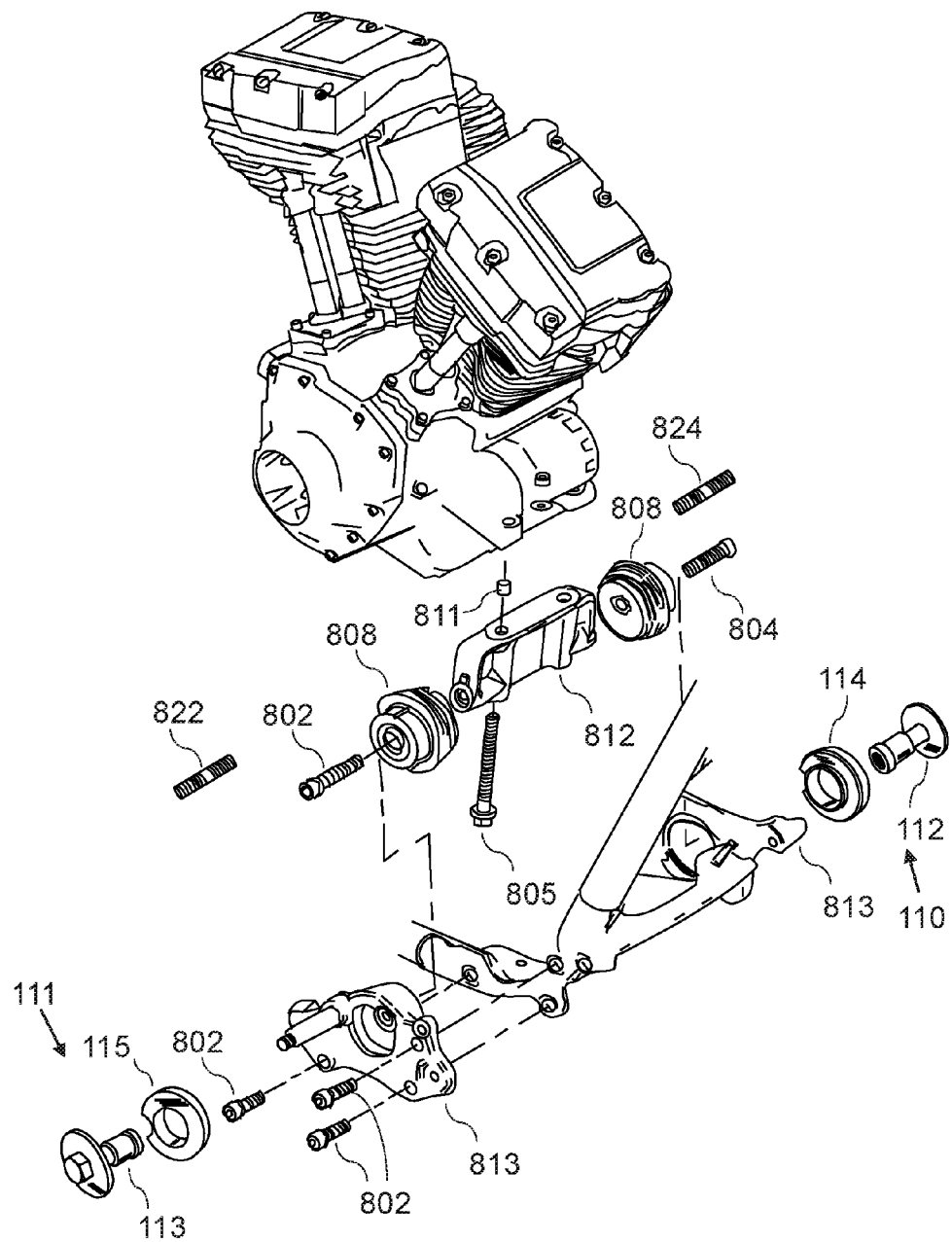
FIG. 8 is an exploded view of a stabilized rubber mounted front engine mount, according to an embodiment of the invention.

In a related example embodiment, FIG. 8, shows a stabilized rubber mounted front engine mount, for a Harley-Davidson 2011 FLHTC 96 FF4 Electra Glide Classic, including a rubber mounted front engine mount, including:

a) screws 802 804 805;
b) right and left end caps 813;
c) right and left rubber mounts 808, also referred to as bottom/front engine mounts 808;
d) a dowel bushing 811; and
e) a front bracket 812; mounted with
f) right and left motor mount stabilizers 111 110, each respectively comprising a stabilizer cap 113 112 and a thrust bearing 115 114, such that the right and left screws 802 804 are replaced with right and left double-threaded bolts 822 824,
   such that inner ends of the right and left double-threaded bolts 822 824 are screwed into respectively the right and left sides of the front bracket 812, such the right and left double-threaded bolts 822 824 protrude through respectively the right and left end caps 813,
   such that the right and left stabilizer caps 112 113 are screwed onto outer ends of the right and left double-threaded bolts 822 824,
   with the thrust bearings 115 114, mounted between the stabilizer caps 112 113 and the end caps 813.

Figure 9:
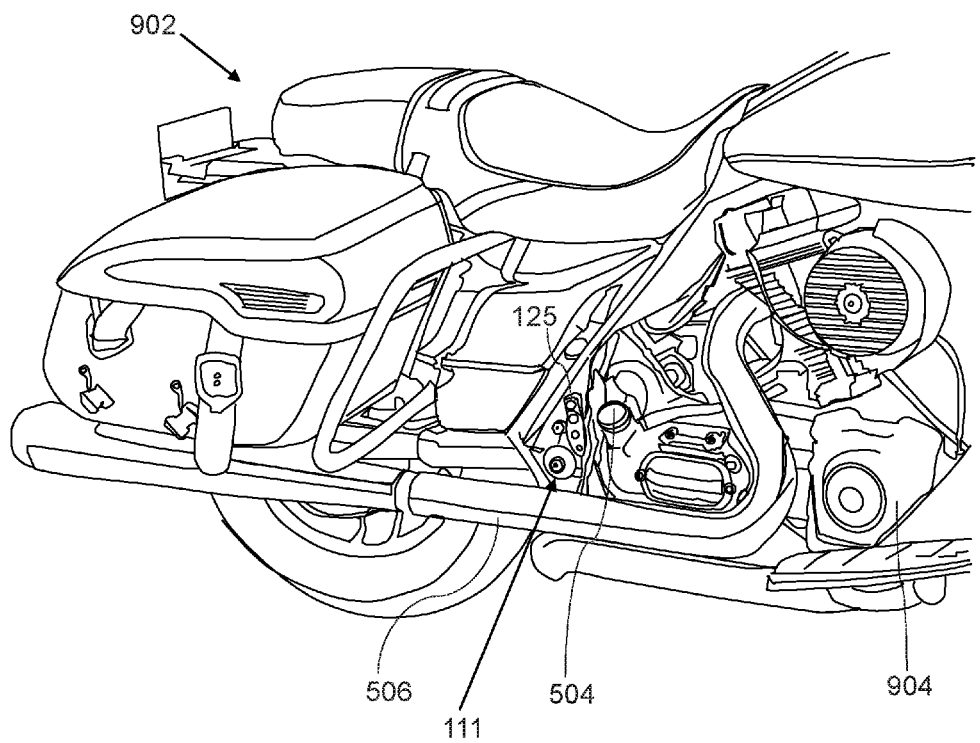
FIG. 9 is a perspective view of a swingarm stabilizer mounted on a motorcycle, according to an embodiment of the invention.

In a related example embodiment, FIG. 9 shows a right-side perspective view of a right swingarm stabilizer 111 mounted on the right side of a motorcycle 902, here showing only a rear end of the motorcycle, also showing part of a right support bracket 125, and further showing part of an engine 904, an oil cap 504, and an exhaust pipe 506.

Figure 10:
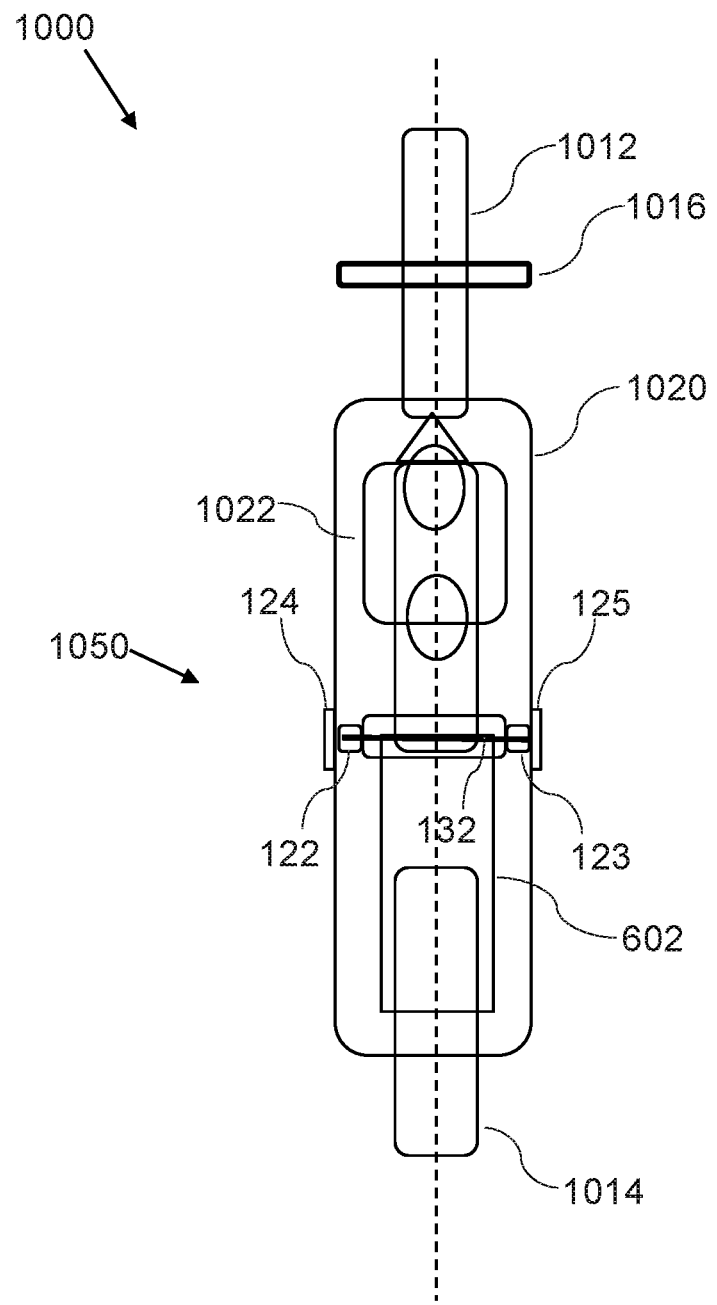
FIG. 10 is a top schematic view of a conventional rubber mounted drivetrain mounted on a motorcycle in a configuration without lateral load.
Figure 11:
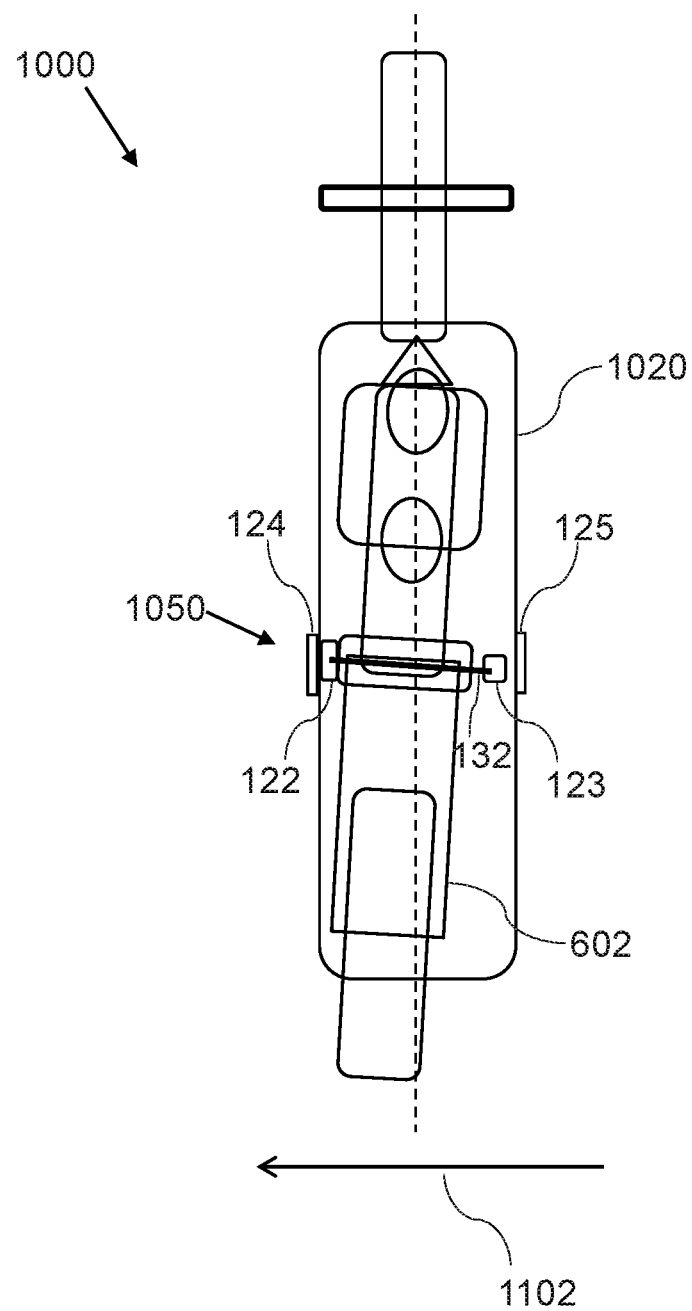
FIG. 11 is a top schematic view of a conventional rubber mounted drivetrain mounted on a motorcycle in a configuration with lateral load.

In a related example embodiment, FIG. 10 shows a schematic top view of a motorcycle 1000 in stable configuration without substantial lateral load, such that the motorcycle 1000 is equipped with a conventional rubber mounted drivetrain 1050, wherein the motorcycle includes:

a) front and rear wheels 1012 1014;
b) a front axle 1016;
c) a frame 1020;
d) An engine 1022; and e) a conventional rubber mounted drive train 1050, including:
   i. a swingarm 602;
   ii. right and left support brackets 125 124;
   iii. right and left rubber isolators 123 122;
   iv. a swingarm pivotal axle 132;

In a further related example embodiment, FIG. 11 shows a schematic top view of the motorcycle 1000 in a configuration with a lateral load 1102, for example caused by driving the motorcycle 1000 through a turn, such that the rubber mounted swingarm 602 is twisted relative to the frame 1020, causing the right rubber isolator 123 to become unloaded. The twisting effect is shown in FIG. 11 with some exaggeration for illustrative purposes.

Figure 12:
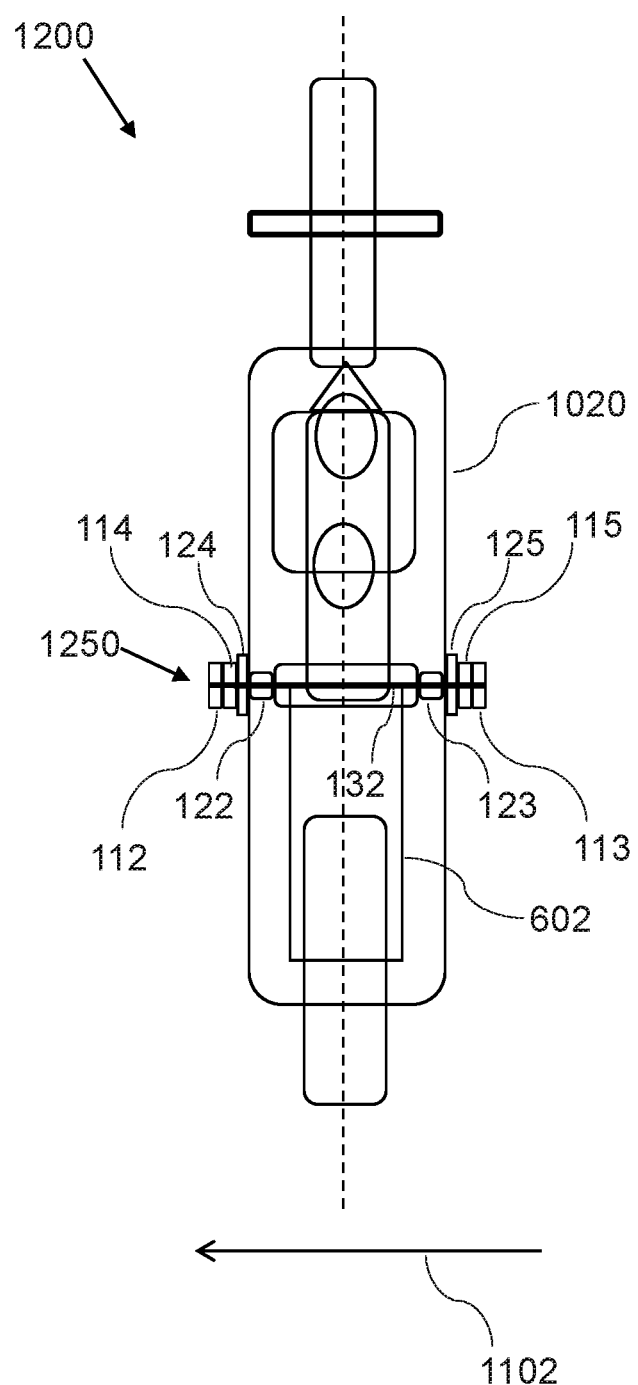
FIG. 12 is a top schematic view of a stabilized rubber mounted drivetrain mounted on a motorcycle in a configuration with lateral load, according to an embodiment of the invention.

In a further related example embodiment, FIG. 12 shows a schematic top view of a motorcycle 1200 which is mounted with a stabilized rubber mounted drive train 1250, which further includes right and left stabilizer caps 113 112 and right and left thrust bearing 115 114, such that the motorcycle 1200 is in a configuration with lateral load 1102, for example caused by driving the motorcycle 1200 through a turn, such that the rubber mounted swingarm 602 is held in place by the stabilized rubber mounted drive train 1250.

Figure 13:
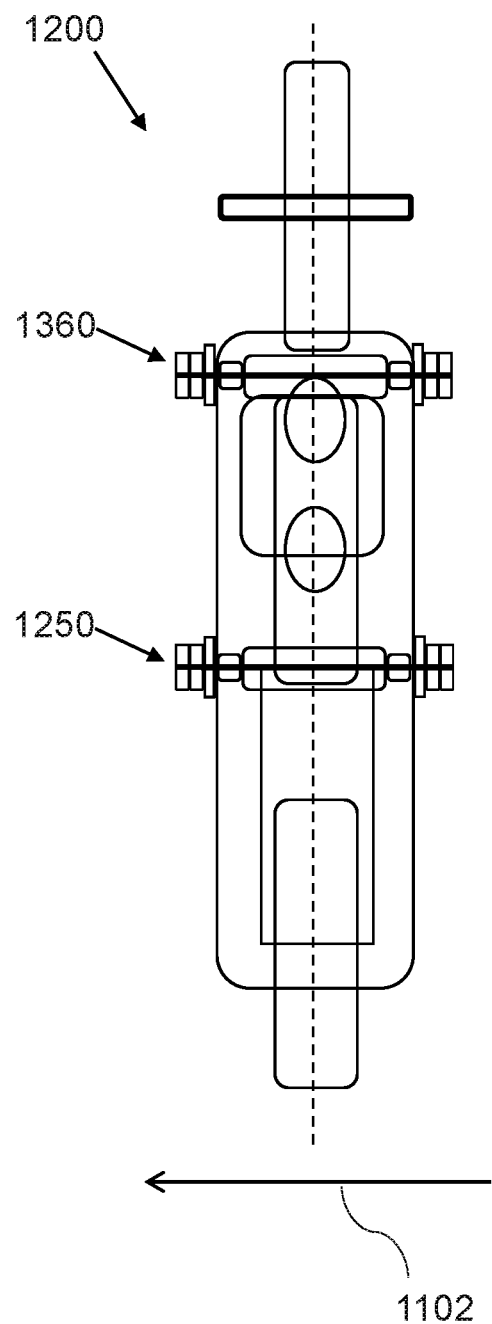
FIG. 13 is a top schematic view of a stabilized rubber mounted drivetrain and a stabilized rubber mounted front engine mount, which are mounted on a motorcycle in a configuration with lateral load, according to an embodiment of the invention.

In a further related example embodiment, FIG. 13 shows a schematic top view of a motorcycle 1200 which is mounted with a stabilized rubber mounted drive train 1250 and a stabilized rubber mounted front engine mount 1360, which both remain stable under a lateral load 1102.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A stabilized rubber mounted drivetrain for mounting on a motorcycle, comprising:
   a) a rubber mounted drivetrain, comprising:
      a swingarm pivotal axle, which is configured as a pivotal axle for a swingarm of the motorcycle;
      at least one rubber isolator; and
      at least one support bracket, which is connected to a motorcycle frame;
      wherein the at least one rubber isolator is mounted adjacent to and between an end of the swingarm pivotal axle and the at least one support bracket, whereby the at least one rubber isolator reduces outward movement of the end of the swingarm pivotal axle relative to the motorcycle frame, while providing a rubberized isolation and reducing transfer of vibrations from the rubber mounted drivetrain to the motorcycle frame; and
   b) at least one swingarm stabilizer, comprising:
      a stabilizer cap; and
      a thrust bearing;
      wherein an inner end of the stabilizer cap is connected to the end of the swingarm pivotal axle, such that the thrust bearing is held in place relative to the motorcycle frame by contact with an outer end of the stabilizer cap;
      wherein an inner surface of the thrust bearing is configured to be immediately adjacent to or in contact with an outer surface of the at least one support bracket, whereby the at least one swingarm stabilizer reduces an inward lateral movement of the end of the swingarm pivotal axle relative to the motorcycle frame;
      whereby the swingarm pivotal axle is held in place and stabilized relative to the motorcycle frame during motorcycle driving events in which the rubber mounted drivetrain endures strong lateral forces.

2. The stabilized rubber mounted drivetrain of claim 1, wherein the stabilizer cap comprises:
   a) a stabilizer cap head;
   b) a stabilizer cap flange; and
   c) a stabilizer cap body, wherein an inner end of the stabilizer cap body, which constitutes the inner end of the stabilizer cap, is connected to the end of the swingarm pivotal axle;
   wherein the stabilizer cap head is connected to an outer end of the stabilizer cap body and the stabilizer cap flange is mounted to the stabilizer cap head on an inside of the stabilizer cap head, at the outer end of the stabilizer cap body, such that the stabilizer cap flange is configured to be directly adjacent to or in contact with the thrust bearing, such that the stabilizer cap flange in conjunction with the thrust bearing is configured to reduce an inward lateral movement of the stabilizer cap, thereby reducing the inward lateral movement of the end of the swingarm pivotal axle, when the stabilizer cap body is attached to the end of the swingarm pivotal axle, with the thrust bearing disposed between the stabilizer cap flange and the at least one rubber isolator.

3. The stabilized rubber mounted drivetrain of claim 2, wherein the stabilizer cap head is configured as a bolt head, whereby a wrench tool can be used to attach the stabilizer cap to the swingarm pivotal axle.

4. The stabilized rubber mounted drivetrain of claim 2, wherein the stabilizer cap is assembled from separate components, the separate components comprising:
   a) the stabilizer cap body, further comprising an outer threaded cavity;
   b) the stabilizer cap head, which is configured as a bolt with a threaded end;
   c) the stabilizer cap flange, which is configured as a first spacer, comprising a first central aperture; and
   d) a second spacer, comprising a second central aperture;
   wherein the threaded end of the stabilizer cap head is screwed into the outer threaded cavity of the stabilizer cap body;
   wherein the second spacer and the stabilizer cap flange are mounted between the stabilizer cap body and the stabilizer cap head, such that the threaded end of the stabilizer cap head protrudes through the first and second central apertures, such that the second spacer is adjacent to the stabilizer cap body;
   whereby the second spacer is configured to adjust a clearance between the stabilizer cap flange and the thrust bearing.

5. The stabilized rubber mounted drivetrain of claim 1, wherein the at least one rubber isolator is comprised of a left rubber isolator and a right rubber isolator, and wherein the at least one swingarm stabilizer is comprised of a left swingarm stabilizer and a right swingarm stabilizer.

6. The stabilized rubber mounted drivetrain of claim 1, wherein the at least one swingarm stabilizer further comprises a spacer, which comprises an aperture, such that the spacer is mounted on the end of the swingarm pivotal axle between the inner end of the stabilizer cap and the at least one rubber isolator, such that the swingarm pivotal axle protrudes through the aperture of the spacer, whereby the spacer is configured to adjust a clearance between the outer end of the stabilizer cap and the thrust bearing.

7. The stabilized rubber mounted drivetrain of claim 1, wherein the stabilizer cap is machined from one piece of a metal alloy.

8. The stabilized rubber mounted drivetrain of claim 1, wherein the thrust bearing comprises an aperture, whereby the aperture is configured to allow the thrust bearing to engage with the at least one support bracket, areas of the rubber mounted drivetrain adjacent to the at least one support bracket, or with cables, wires, and other attachments that connect to the rubber mounted drivetrain.

9. The stabilized rubber mounted drivetrain of claim 1, wherein the thrust bearing is made of a plastic material.

10. A swingarm stabilizer, comprising:
 a) a stabilizer cap;
 b) a thrust bearing; and
 c) a first spacer, which comprises a first central aperture;
 wherein the stabilizer cap is configured to connect to an end of a swingarm pivotal axle of a motorcycle, which is equipped with a rubber mounted drivetrain, such that the thrust bearing is configured to be held in place relative to a motorcycle frame by contact with an outer end of the stabilizer cap;
 wherein an inner surface of the thrust bearing is configured to be adjacent to or in contact with an outer surface of a support bracket of the rubber mounted drivetrain, such that the swingarm stabilizer reduces an inward lateral movement of the end of the swingarm pivotal axle relative to the motorcycle frame;
 whereby the swingarm stabilizer provides an increased stability of a rubber isolator of the rubber mounted drivetrain, such that the rubber isolator is held in place relative to the motorcycle frame during motorcycle driving events in which the rubber mounted drivetrain endures strong lateral forces;
 wherein the first spacer is configured to be mounted on the end of the swingarm pivotal axle between an inner end of the stabilizer cap and the rubber isolator, such that the swingarm pivotal axle protrudes through the first central aperture of the first spacer, whereby the first spacer is configured to adjust a clearance between the outer end of the stabilizer cap and the thrust bearing.

11. The swingarm stabilizer of claim 10, wherein the stabilizer cap further comprises:
 a) a stabilizer cap head;
 b) a stabilizer cap flange, wherein the stabilizer cap flange is configured to exert pressure on the thrust bearing;
 c) a stabilizer cap body, wherein an inner end of the stabilizer cap body is configured to connect to the end of the swingarm pivotal axle;
 wherein the stabilizer cap head is connected to an outer end of the stabilizer cap body and the stabilizer cap flange is mounted to the stabilizer cap head on an inside of the stabilizer cap head, at the outer end of the stabilizer cap body, such that the stabilizer cap flange is configured to be directly adjacent to or in contact with the thrust bearing, such that the stabilizer cam flange in conjunction with the thrust bearing is configured to reduce an inward lateral movement of the stabilizer cap, thereby reducing the inward lateral movement of the end of the swingarm pivotal axle, when the stabilizer cap body is attached to the end of the swingarm pivotal axle, with the thrust bearing disposed between the stabilizer cap flange and the rubber isolator.

12. The swingarm stabilizer of claim 11, wherein the stabilizer cap is assembled from separate components, the separate components comprising:
 a) the stabilizer cap body, further comprising an outer threaded cavity;
 b) the stabilizer cap head, which is configured as a bolt with a threaded end; and
 c) the stabilizer cap flange, which is configured as a second spacer, comprising a second central aperture;
 wherein the threaded end of the stabilizer cap head is screwed into the outer threaded cavity of the stabilizer cap body;
 wherein the first spacer and the stabilizer cap flange are mounted between the stabilizer cap body and the stabilizer cap head, such that the threaded end of the stabilizer cap head protrudes through the first and second central apertures, such that the first spacer is adjacent to the stabilizer cap body;
 whereby the first spacer is configured to adjust a clearance between the stabilizer cap flange and the thrust bearing.

13. The swingarm stabilizer of claim 11, wherein the stabilizer cap head is configured as a bolt head, whereby a wrench tool can be used to attach the stabilizer cap to the swingarm pivotal axle.

14. The swingarm stabilizer of claim 10, wherein the stabilizer cap is machined from one piece of a metal alloy.

15. The swingarm stabilizer of claim 10, wherein the thrust bearing comprises an aperture, whereby the aperture is configured to allow the thrust bearing to engage with the support bracket, areas of the rubber mounted drivetrain adjacent to the support bracket, or with cables, wires, and other attachments that connect to the rubber mounted drivetrain.

16. The swingarm stabilizer of claim 10, wherein the thrust bearing is made of a plastic material.

* * * * *